(12) United States Patent
Gowal et al.

(10) Patent No.: US 12,738,282 B2
(45) **Date of Patent: *Sep. 15, 2026**

(54) VERIFYING THE PROVENANCE OF A DIGITAL OBJECT USING WATERMARKING AND EMBEDDINGS

(71) Applicant: GDM Holding LLC, Mountain View, CA (US)

(72) Inventors: Sven Adrian Gowal, Cambridge (GB); Christopher Gamble, London (GB); Florian Nils Stimberg, London (GB); Sylvestre-Alvise Guglielmo Rebuffi, Sceaux (FR); Sree Meghana Thotakuri, London (GB); Jamie Hayes, Levenshulme (GB); Ian Goodfellow, Mountain View, CA (US); Rudy Bunel, London (GB); Miklós Zsigmond Horváth, London (GB); David Stutz, London (GB); Olivia Anne Wiles, London (GB)

(73) Assignee: GDM Holding LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/886,824

(22) Filed: Sep. 16, 2024

(65) Prior Publication Data

US 2025/0149048 A1 May 8, 2025

Related U.S. Application Data

(63) Continuation of application No. 18/510,537, filed on Nov. 15, 2023, now Pat. No. 12,094,474.

(30) Foreign Application Priority Data

Apr. 11, 2023 (EP) .................................... 23167380

(51) Int. Cl.

| | |
|---|---|
| ***G10L 19/018*** | (2013.01) |
| ***G06F 21/16*** | (2013.01) |
| ***G10L 21/0232*** | (2013.01) |

(52) U.S. Cl.

CPC ........... *G10L 19/018* (2013.01); *G06F 21/16* (2013.01); *G10L 21/0232* (2013.01)

(58) Field of Classification Search

CPC ... G10L 19/018; G10L 19/02; G10L 21/0232; G10L 25/30; G06F 21/16

See application file for complete search history.

(56) References Cited

U.S. PATENT DOCUMENTS

| | | |
|---|---|---|
| 6,580,809 B2 | 6/2003 | Stach |
| 7,068,809 B2 | 6/2006 | Stach |

(Continued)

FOREIGN PATENT DOCUMENTS

| | | |
|---|---|---|
| CN | 113990330 | 1/2022 |

OTHER PUBLICATIONS

Chen at al., “A Simple Framework for Contrastive Learning of Visual Representations,” Proceedings of the 37th International Conference on Machine Learning, 2020, 119:1597-1607.

Corbett et al., “Spanner: Google’s Globally Distributed Database,” ACM Transactions on Computer Systems, Aug. 2013, 31(3):8.

Extended Search Report in European Appln. No. 23167380.7, dated Aug. 29, 2023, 15 pages.

(Continued)

*Primary Examiner* — Hosuk Song

(74) *Attorney, Agent, or Firm* — Fish & Richardson P.C.

(57) ABSTRACT

Methods, systems, and apparatus, including computer programs encoded on computer storage media, for verifying the provenance of a digital object generated by a neural network, such as an image or audio object. Also methods, systems, and apparatus, including computer programs, for training a watermarking neural network and a watermark decoding neural network. The described techniques make efficient use of computing resources and are robust to attack.

9 Claims, 8 Drawing Sheets

(56) References Cited

U.S. PATENT DOCUMENTS

| | | | | |
|---|---|---|---|---|
| 8,050,452 | B2 | 11/2011 | Bradley | |
| 8,548,810 | B2 | 10/2013 | Rodriguez | |
| 8,965,547 | B2 | 2/2015 | Wabnik | |
| 9,305,559 | B2 | 4/2016 | Sharma | |
| 10,236,006 | B1 | 3/2019 | Gurijala | |
| 10,546,590 | B2 | 1/2020 | Sharma | |
| 11,004,455 | B2 | 5/2021 | Murtaza | |
| 11,019,407 | B2 * | 5/2021 | Revital | G06F 21/1063 |
| 11,183,198 | B2 | 11/2021 | Filler | |
| 11,354,532 | B1 | 6/2022 | Stancil | |
| 11,538,485 | B2 | 12/2022 | Huffman | |
| 11,625,805 | B2 * | 4/2023 | Alattar | G06T 1/0021 382/100 |
| 11,990,143 | B2 | 5/2024 | Sharma | |
| 12,050,671 | B2 * | 7/2024 | Chattopadhyay | G06N 3/08 |
| 12,094,474 | B1 * | 9/2024 | Gowal | G10L 21/0232 |
| 12,158,929 | B1 * | 12/2024 | Huang | H04L 9/0643 |
| 12,260,866 | B2 | 3/2025 | Naylor | |
| 12,417,394 | B2 * | 9/2025 | Charette | G06N 3/09 |

OTHER PUBLICATIONS

Hayes et al., "Towards transformation-resilient provenance detection of digital media," CoRR, Nov. 14, 2020, arXiv:2011.0355v1, 19 pages.

International Search Report and Written Opinion in International Appln. No. PCT/EP2024/055480, dated Apr. 5, 2024, 33 pages.

Neekhara et al., "FaceSigns: Semi-Fragile Neural Watermarks for media authentication and countering deepfakes," CoRR, Apr. 5, 2022, arxiv.org/abs/2204.01960, 13 pages.

Sahar et al., "Adversarial watermarking transformer: Towards tracing text provenance with data hiding," 2021 IEEE Symposium on Security and Privacy (SP), 2021, 20 pages.

Vaswani et al., "Attention Is All You Need," 31st Conference on Neural Information Processing Systems (NIPS 2017), 2017, 11 pages.

Liu et al., "DeAR: A Deep-Learning-Based Audio Re-recording Resilient Watermarking," The Thirty-Seventh AAAI Conference on Artificial Intelligence (AAAI-23), 2023, pp. 13201-13209.

Office Action in Chinese Appln. No. 202480025005.1, mailed on May 25, 2026, 14 pages (with English translation).

* cited by examiner

VERIFYING THE PROVENANCE OF A DIGITAL OBJECT USING WATERMARKING AND EMBEDDINGS

CROSS-REFERENCE TO RELATED APPLICATION

This application is a continuation and claims priority to U.S. patent application Ser. No. 18/510,537, filed Nov. 15, 2023 which claims the benefit of the filing date of European Patent Application EP23167380.7, which was filed on Apr. 11, 2023, and which is incorporated herein by reference in its entirety.

BACKGROUND

This specification relates to verifying the provenance of a digital object such as a digital object generated using a machine learning model.

Machine learning models can be trained to generate a digital object, such as a passage of text or an image. Some machine learning models are parametric models and generate the output based on values of the parameters of the model. Neural networks are machine learning models that employ one or more layers of nonlinear units; deep neural networks include one or more hidden layers in addition to an output layer. Each layer of the network generates an output in accordance with current values of a respective set of parameters.

SUMMARY

This specification describes a method and a corresponding system, implemented as computer programs on one or more computers in one or more locations, that can verify the provenance of a digital object. The digital object can be, e.g., a still or moving image, a digital audio object representing an audio waveform, or a combination of these such as a multimedia object. There is also described a method, and a corresponding system, for training a system for watermarking a digital object.

In one aspect there is described a computer-implemented method of training a watermarking system comprising a watermark generation neural network and a watermark decoding neural network. In general the watermark decoding neural network is configured to identify the presence of a watermark; in some implementations it may (but need not) decode information from the watermark.

One implementation of the method is used for particularly for audio data objects. In general an audio data object comprises a representation of an audio signal, more particularly a digital representation of the audio signal in the time domain. An audio object may be a time slice of an extended audio signal, e.g., a moving time slice, or a discrete object. The training method is performed using a plurality of such audio data objects.

In broad terms, the method involves generating a spectrogram of an audio data object and processing this using the watermark generation neural network to generate a watermark. An adversarial transformation is applied to clean audio data objects and to watermarked objects, and the watermark decoding neural network is used to process these to generate a watermarking signal. The system is trained using an objective based on correctly classifying each watermarking signal, in implementations using a form of cross-entropy loss.

In another aspect there is described a computer-implemented method of verifying the provenance of a digital object, in particular to predict (indicate) whether or not the digital object was created by a generative neural network (the generative neural network used to generate the digital object, if it was created by generative neural network). The method involves maintaining an object verification system, in implementations an object generation and verification system, comprising a first interface to receive a digital object or a request to generate or verify a digital object, optionally a generative neural network configured to process the request to generate a digital object in accordance with the request, a watermarking neural network configured to process the digital object to generate a watermarked digital object, and a second interface (which may be the same as, or different to, the first interface) to provide the watermarked digital object for use. The object generation and verification system also includes an embedding neural network configured to process the digital object to generate an embedding of the digital object, and an object verification database configured to store at least the embedding of the digital object.

As used herein an "embedding" of a digital object can refer to a representation of the object as an ordered collection of numerical values, e.g., a vector or matrix of numerical values. An embedding of an entity can be generated as the output of a neural network that processes data characterizing the entity.

The method also includes receiving a query digital object for verification, processing the query digital object using a watermark decoding neural network to generate a watermarking signal for the query digital object, and also processing the query digital object using the embedding neural network to generate a query embedding of the query digital object. The object verification database is interrogated using the query embedding to determine a set of one or more similarity scores for a corresponding set of one or more stored embeddings of digital objects that are similar to the query digital object. The provenance of the query digital object is then verified based on a combination of the watermarking signal and the set of one or more similarity scores. In general the watermarking signal can indicate whether or not the query digital object has been watermarked.

In some implementations the method also includes receiving a request to generate the digital object, e.g., from a user, and processing the request, using the generative neural network, to generate the digital object. The digital object is then processed using the watermarking neural network, to generate the watermarked digital object, and the watermarked digital object is provided for use, e.g., by the user. The digital object is also processed using the embedding neural network to generate the embedding of the digital object, which is stored in the object verification database. The provenance of the query digital object can then be verified as having been generated by the object generation and verification system conditional upon the query embedding matching the embedding of the digital object stored in the object verification database, i.e., only if a match is found.

In some implementations the watermarking neural network and the watermark decoding neural network have been jointly trained (end-to-end) to generate the watermarking signal under an adversarial transformation of the watermarked digital object, i.e., a transformation, or perturbation, that increases a likelihood that the watermarking signal incorrectly indicates the watermarked digital object as not watermarked.

In a related aspect there is described a computer implemented method of generating a digital object with a verifiable provenance. The method involves maintaining an object generation and verification system as described above. The method also involves receiving a request to generate the digital object, processing the request using the generative neural network to generate the digital object, processing the digital object using the watermarking neural network to generate the watermarked digital object, and providing the watermarked digital object for use.

The method further comprises processing the digital object using the embedding neural network to generate the embedding of the digital object, and storing the embedding of the digital object in the object verification database. Thus the provenance of the digital object is verifiable by generating a query embedding of a query digital object using the embedding neural network, interrogating the object verification database using the query embedding to determine a set of one or more similarity scores for a corresponding set of one or more stored embeddings of digital objects that are similar to the query digital object, and verifying the provenance of the query digital object based on a combination of a watermarking signal indicating watermarking of the query digital object and the set of one or more similarity scores.

In a further aspect there is described a computer-implemented method of training a watermarking system for watermarking a digital object. The method may be used to train the above described watermarking neural network and watermark decoding neural network. The digital object may comprise an image object, i.e., a still or moving image, or an audio data object, or both.

Some of the training methods described herein are particularly suitable for training a watermarking system for watermarking an image, e.g., because of the adversarial transformation(s) that they use; some are particularly suitable for training a watermarking system for watermarking an audio data object. In some implementations these approaches, e.g., different types of adversarial transformation, may be combined to train a watermarking system that is suitable for watermarking a multimedia object that includes two or more of text, an image, and audio, e.g., a combined audio and image data object.

In implementations the watermarking system comprises a watermarking neural network configured to process a digital object, in accordance with watermarking neural network parameters, to generate a watermarked digital object; and a watermark decoding neural network configured to process a watermarked digital object, in accordance with watermark decoding neural network parameters, to generate a watermarking signal.

In implementations the method is performed for each of a plurality of training objects. The method processes a training object using the watermarking neural network to generate a watermarked training object. The method then applies a differentiable adversarial transformation to the watermarked training object to generate an alternative training object. In general the adversarial transformation is one that decreases the accuracy of the watermarking signal in identifying the watermarked training object as watermarked. The method processes the alternative training object using the watermark decoding neural network to generate the watermarking signal for the alternative training object.

The method backpropagates gradients of an objective function, where the gradients are taken with respect to the watermark decoding neural network parameters and the watermarking neural network parameters. The gradients are backpropagated through the watermark decoding neural network, the differentiable adversarial transformation, and the watermarking neural network, to update the watermark decoding neural network parameters and the watermarking neural network parameters. This may use any appropriate gradient descent optimization algorithm, e.g., Adam or AdamW, or another optimization algorithm. The objective function measures an accuracy of the watermarking signal in identifying the watermarked training object as watermarked. The backpropagation jointly trains the watermark decoding neural network and the watermarking neural network to optimize the objective function.

In some further aspects, the specification describes a watermarking neural network trained in this way; and a watermark decoding neural network trained in this way.

Particular embodiments of the subject matter described in this specification can be implemented so as to realize one or more of the following advantages.

There is a general need for improved systems to identify the provenance of digital objects generated using machine learning models. The increasing prevalence of such objects, and the size of such objects, e.g., the size/resolution of generated images, could result in a computational bottleneck. Accordingly, there is a general need for techniques that address this, whilst remaining robust.

Implementations of the system can provide provenance verification that is faster and requires less computations than some other approaches. The described training methods can also require less computation, and facilitate the use of an asymmetric architecture in which the watermarking neural network can be shallower, i.e., have fewer parameters (e.g., weights) than the watermark decoding neural network. Thus watermarks can be generated quickly, but can still detected reliably using the deeper, watermark decoding neural network.

In implementations of the system the object verification database stores an embedding of the original digital object, as generated by the generative neural network, rather than an embedding of the watermarked digital object. Nonetheless there is no need to remove the watermark from the query digital object before generating the query embedding used for querying the object verification database to determine the similarity scores. This approach helps to provide robustness when verifying the provenance of a digital object. Optionally the object verification database can also store the originally generated digital object, to facilitate further checks.

Implementations of the system are tolerant of adversarial perturbations, such as attempts to modify a watermarked digital object, e.g., a watermarked image, so that the watermark is not recognized. Thus the trained watermark decoding neural network can detect the presence of a watermark even under various transformations, such as standard image editing transformations. In implementations, the embedding of the digital object is also tolerant to adversarial perturbations. Watermarking an audio data object based on a spectrogram as described herein facilitates concealing the watermarking information, and can enable a watermark to be inaudible, and can also increase the robustness of the watermark to transformations such audio compression.

In implementations the watermarks generated are relatively diverse, with an overall reduced effect on the content of the digital object, and also making watermark detection by a malicious entity difficult. In addition, interrogating the object verification database using a query embedding based on watermarked digital object can improve the retrieval performance, e.g., a True Positive Rate of retrieval.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE FIGURES

Like reference numbers and designations in the various drawings indicate like elements.

DETAILED DESCRIPTION

Figure 1:
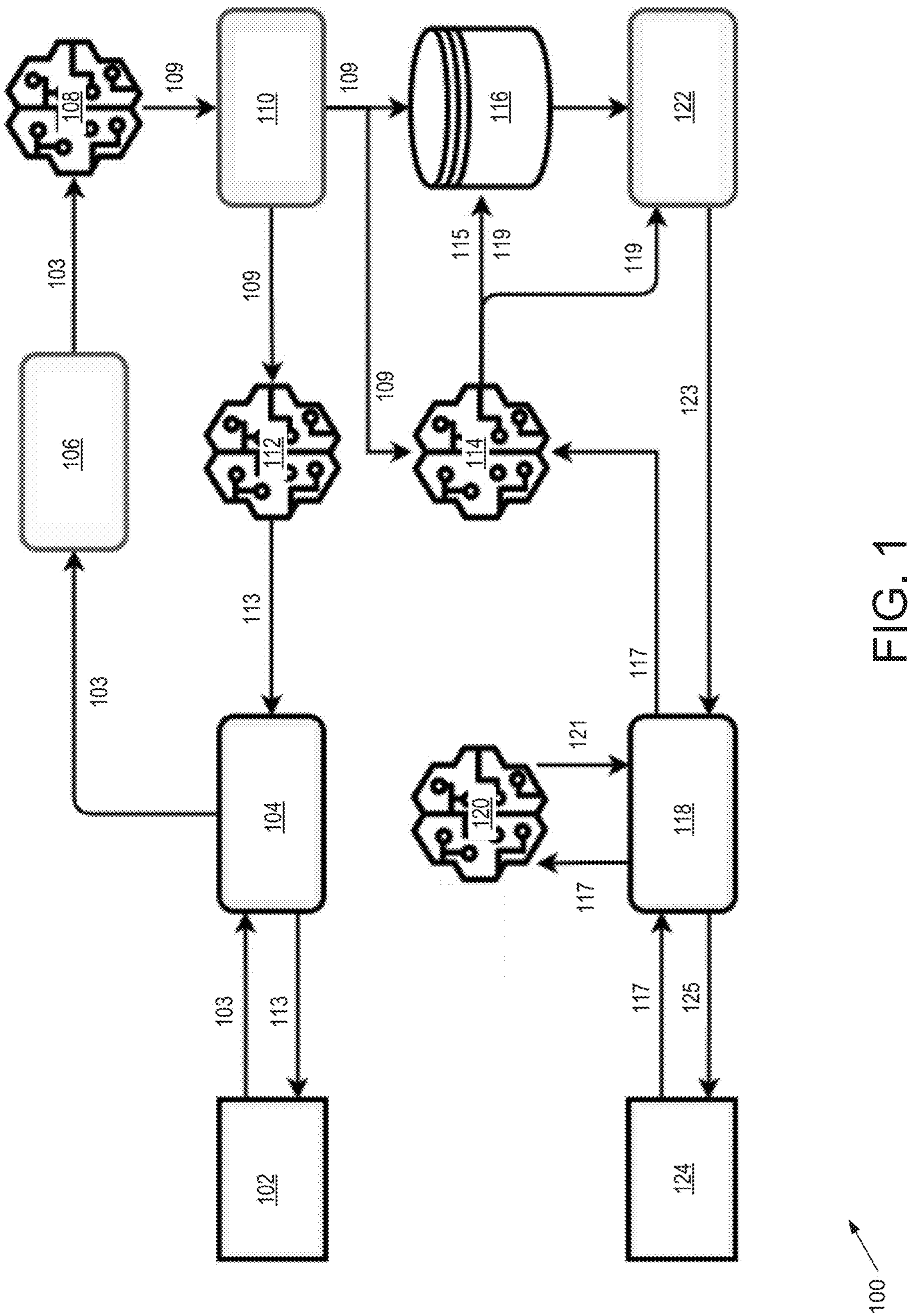
FIG. 1 shows an example of an object generation and verification system.

FIG. 1 shows an example of an object generation and verification system 100 that can be used for verifying the provenance of a digital object. The system 100 may be implemented as one or more computer programs on one or more computers in one or more locations.

The system 100 comprises a first interface 104 to receive a request 103 to generate a digital object. The first interface 104 may comprise, e.g., an API (Application Programming Interface), a web page, a digital assistant, or any other type of machine or human interface. The request may come from a human or machine user 102, and may include information that characterizes a digital object to be generated by the system, e.g., a text prompt that characterizes a still or moving image to be generated by the system. In some implementations the first interface 104 also provides a watermarked version of the digital object 113 to the user 102. In some implementations the watermarked digital object 113 is provided via a second interface (not shown) that may be different to the first interface. The system 100 can include a request filter 106 to filter the request, e.g., the text prompt, obtain a filtered request. Such filtering can be used to remove undesirable requests, or to remove undesirable information from a request, i.e., to inhibit requests that should not be used to generate a digital object.

The (filtered) request 103 is provided to a generative neural network 108 that is configured to process the request to generate a digital object 109 in accordance with the request. As one example, the generative neural network 108 may be configured to generate a still or moving image from a text prompt that includes a depiction of the text prompt. As another example, the generative neural network 108 may be configured to generate a digital object representing audio data, e.g., for a sound described by the text prompt, or for speech that represents text in a text prompt, and/or for speech where the request identifies a desired speaker for the speech.

In general, the digital object may be any type of object, such as an image, audio, or multimedia object. The generated digital object can comprise a plurality of elements, e.g., continuous valued elements, that define the digital object. For example, where the generated digital object comprises an image the elements may comprise values, e.g., intensity values, of the pixels. Where the generated digital object comprises audio, e.g., speech, the elements may comprise values characterizing a waveform of the audio, e.g., instantaneous values of the waveform or a values for a time-frequency representation of the waveform. In some implementations the generated digital object 109 is filtered by an object filter 110 to remove undesired digital objects, e.g., undesired images.

The (filtered) digital object 109 is provided to a watermarking neural network 112 that is configured to process the digital object 109 to generate a watermarked digital object 113. The watermarked digital object 113 is provided to the interface 104, which can then provide it to the user 102. The watermarking neural network 112 can be any type of neural network that is configured to add a watermark to a digital object, e.g., a watermarking neural network trained as described later. For example, the watermarking neural network 112 can be based on a convolutional neural network, or on a neural network that implements a self-attention mechanism such as a Transformer-based neural network (Vaswani et al., "Attention Is All You Need"); it can implement a zero-bit or multi-bit watermarking technique.

In some implementations the watermarking neural network 112 may be randomly selected from a group of watermarking neural networks, or the watermarking neural network 112 may comprise an ensemble of watermarking neural networks having outputs that are combined to add the watermark to a digital object. As another example, an ensemble of paired watermarking and watermark decoding neural networks can be used during training, e.g., training as described later, to provide a watermark decoding neural network that is unique in the sense that other watermark decoding neural networks of the ensemble are unable to detect (decode) a watermark generated by the watermarking neural network with which it was paired. Such approaches can increase robustness of the system to adversarial attacks.

The digital object 109 is also provided to an embedding neural network 114 that is configured to process the digital object to generate an embedding 115 of the digital object 109. The embedding neural network 114 can have any appropriate neural network architecture and can include any appropriate types of neural network layers (e.g., fully-connected layers, attention-layers, convolutional layers, etc.) in any appropriate numbers (e.g., 5 layers, 10 layers, or more), and connected in any appropriate configuration (e.g., as a linear sequence of layers).

In some implementations the embedding neural network 114 has been trained using a contrastive loss. Such a contrastive loss can be a loss that encourages embeddings generated from transformed versions of the same training digital object to be more similar, and embeddings generated from different training digital objects (i.e., that are not transformed versions of the same training digital object) to be more different.

The embedding 115 of the digital object 109 is stored in an object verification database 116, e.g., a relational database, e.g., Spanner (Corbett et al., "Spanner: Google's Globally—Distributed Database", Proceedings of OSDI 2012). In some implementations the original, i.e., unwatermarked, digital object 109 is also stored in the database 116, e.g., in association with the embedding 115. Storing and looking up digital objects based on their embeddings facilitates matching between digital objects even when one of them has been subject to watermarking, or a malicious transformation.

The system 100 also includes a query interface 118 to receive a query digital object 117 for verification, e.g., from a human or machine user 124 as previously described for interface 104. The user 124 may be the same as, or different to, the user 102.

In some implementations the query interface 118 can rate limit queries. For example, it can limit a rate at which queries can be submitted by a particular user, or it can specify a maximum number of queries that any particular user may submit within a predetermined time interval. This can increase the systems robustness to attacks by malicious users. Such approaches can be particularly useful when combined with the watermarking neural network training scheme described later, which can result in individual watermarks that are hard to attack.

The query interface 118 provides the query digital object 117 to a watermark decoding neural network 120 that is configured to generate a watermarking signal 121 for the query digital object 117. The watermark decoding neural network 120 can be any neural network that is suitable to decode the watermark applied by the watermarking neural network 112, e.g., it can be a watermark decoding neural network that has been trained as described below. In some implementations the watermarking neural network and the watermark decoding neural network have been jointly trained (end-to-end) to generate the watermarking signal under an adversarial transformation of the watermarked digital object.

The watermarking signal 121 can relate to a so-called zero-bit watermarking technique, i.e., the watermarking signal 121 can merely indicate whether or not a watermark is present in the query digital object 117. For example, the watermarking signal can indicate a likelihood that a watermark is present, e.g., as a score or probability.

In some implementations the watermark of a watermarked digital object encodes a message comprising one or more bits, e.g., a random number or secret key, in a so-called multi-bit watermarking technique. The watermarking signal 121 may then comprise one component or value that indicates whether or not the watermark is present, and another component or value that provides information decoding the message.

The query interface 118 provides the query digital object 117 to the embedding neural network 114, which processes the query digital object to generate a query embedding 119 of the query digital object. The query embedding 119 is used to by a similarity search service 122 to interrogate the object verification database 116 to determine a set of one or more similarity scores 123 for a corresponding set of one or more stored embeddings of digital objects that are similar to the query digital object 117. For example, the similarity search service 122 processes the query embedding 119 and the set of one or more stored embeddings to determine the set of one or more similarity scores 123 according to any suitable similarity metric, e.g., based on a cosine or dot product similarity or on a distance metric.

The one or more similarity scores 123 can be combined with the watermarking signal 121, e.g., by the query interface 118, to generate a verification output 125 that verifies a provenance of the query digital object 117. For example, the verification output 125 can comprise a verification decision that identifies whether or not the query digital object 117 was generated by the generative neural network 108, e.g., with greater than a threshold probability.

Each similarity score 123 can be combined with the watermarking signal 121 in any convenient manner. As one example, a weighted combination of the watermarking signal and the similarity score can be determined. The weight may be determined empirically as a hyperparameter of the system, e.g., based on the AUC (area under the receiver operating characteristic curve), for a particular true or false positive rate, or precision. As another example, a decision that the query digital object 117 was generated by the generative neural network 108 may be made conditional upon both the watermarking signal indicating that the query object is watermarked, e.g., with greater than a threshold probability, and one of the similarity scores indicating that the query embedding 119 matches the embedding of a digital object stored in the object verification database, e.g., with greater than a threshold probability.

Where the original, i.e., unwatermarked digital object 109 is also stored in the database 116 this can be used for further checks, e.g., for tamper detection to detect whether the query digital object 117 was modified after having been generated and provided to the user 102. For example, the stored original digital object can be used to detect attempted removal of a watermark from the query digital object. Having access to the original digital object can also facilitate a human operator making a comparison between the query digital object 117 and the originally generated digital object.

As previously mentioned, in implementations the embedding neural network 114 is trained using a contrastive loss. For example, the embedding neural network 114 can be trained using the approach described in SimCLR (Chen at al., "A Simple Framework for Contrastive Learning of Visual Representations", arXiv:2002.05709). In such an approach positive pairs of examples are generated by applying different respective random transformations to the same training digital object, e.g., applying cropping or color distortion to an image object or changing the amplitude or frequency characteristics of an audio object, e.g., by filtering. Negative pairs of examples may comprise, e.g., different digital objects. The examples can be processed by the embedding neural network 114, followed by a projection neural network (which may have any suitable architecture) to project the embeddings to a lower dimensionality projected embedding.

The training method can then determine similarity measures between the projected embeddings using a similarity operation, e.g., a cosine similarity measure. The contrastive loss can aim to maximize the similarity of projected embedding pairs, $sim_{ij}$, originating from the same digital object, while minimizing the similarity of other pairs originating from two different digital objects $sim_{ik}$ in a batch of objects, e.g., as $$-\log \frac{e^{sim_{ij}}}{\sum_{other\,pairs} e^{sim_{ik}}}.$$

Optionally an entropy regularization term may also be included in the objective. Such an approach can help the system robustness, e.g., in correctly verifying the provenance of digital objects and in resisting attacks.

In one test, training the embedding neural network 114 using a contrastive loss as described above resulted in an improvement in the True Positive Rate (TPR) at 0.1% False Positive Rate (FPR) from less than 40% to over 95%; in another test an improvement from less than 30% to over 95% was obtained.

Figure 2:
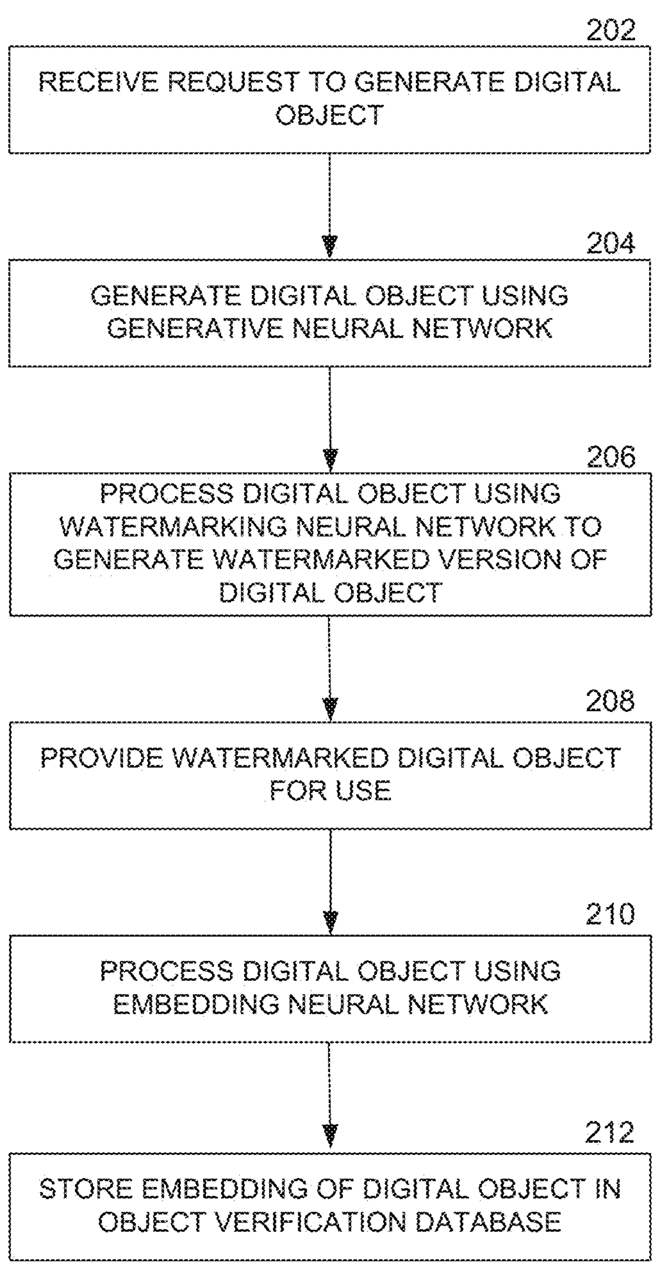
FIG. 2 is a flow diagram of an example process for generating a digital object with a verifiable provenance.

FIG. 2 is a flow diagram of an example process for generating a digital object with a verifiable provenance. The process of FIG. 2 can be performed by a system of one or more computers located in one or more locations. In the example it is described as being performed by the object generation and verification system 100 of FIG. 1.

At step 202 a request 103 is received, e.g., at the first interface 104 of the object generation and verification system 100, to generate a digital object. The request is processed using the generative neural network 108 to generate the digital object 109 (step 204). The digital object 109 is processed using the watermarking neural network 112 to generate a watermarked version of the digital object 113 (step 206), and this is provided via a second interface (that may be the same as the first) for use, e.g., by user 102 (step 208). The digital object 109 is also processed using the embedding neural network 114 to generate an embedding of the digital object 115 (step 210), and the embedding of the digital object is stored in the object verification database 116 (step 212).

When the digital object comprises an digital audio object, generating the watermarked digital object can involve processing the digital audio object to generate a spectrogram of the digital audio object and processing the spectrogram using a watermark generation neural network to generate a watermark for the digital audio object, The watermark and the spectrogram can then be combined to obtain a watermarked spectrogram, and the watermarked spectrogram can be converted to the watermarked digital object. This is described in more detail later.

Figure 3:
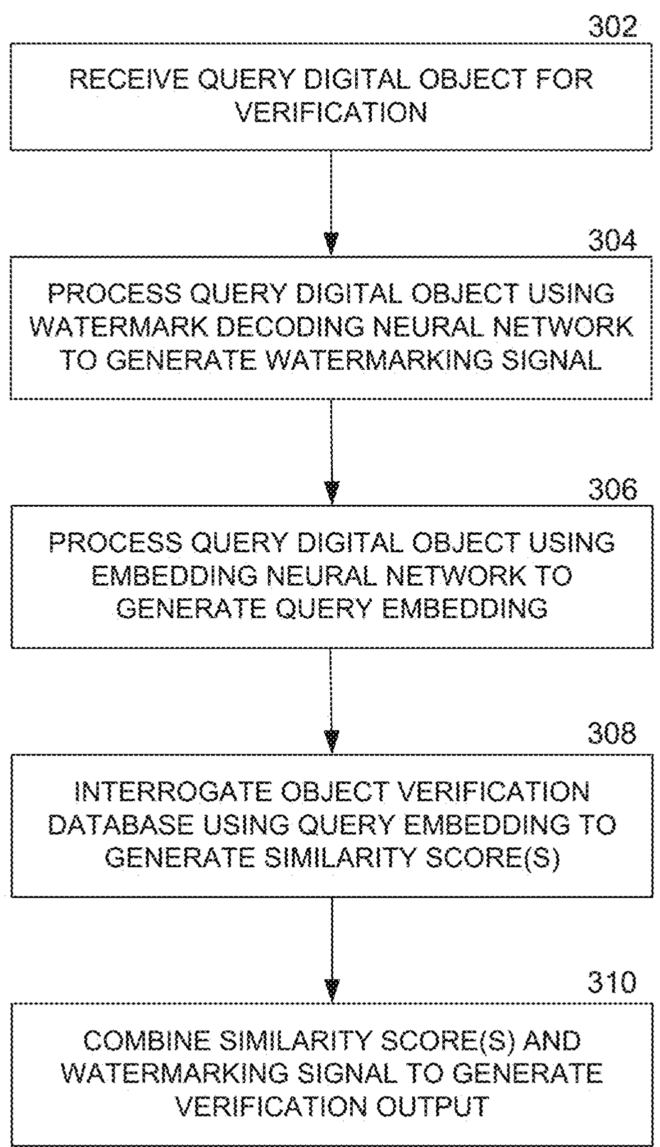
FIG. 3 is a flow diagram of an example process for verifying the provenance of a digital object.

FIG. 3 is a flow diagram of an example process for verifying the provenance of a digital object. The process of FIG. 3 can be performed by a system of one or more computers located in one or more locations, and as an example is described as being performed by the object generation and verification system 100 of FIG. 1.

At step 302 a query digital object 117 is received for verification. The query digital object is processed using the watermark decoding neural network 120 to generate a watermarking signal 121 for the query digital object (step 304), that indicates whether a watermark is predicted to be present. The query digital object 117 is also processed using the embedding neural network 114, to generate a query embedding 119 of the query digital object (step 306). The object verification database 116 is interrogated using the query embedding 119 to determine a set of one or more similarity scores 123, for a corresponding set of one or more stored embeddings of digital objects that are similar to the query digital object (step 308). The watermarking signal 121 and the set of one or more similarity scores 123 are then combined to generate the verification output 125 (step 310). The verification output 125 identifies whether or not the query digital object 117 was generated by the generative neural network 108, and thus verifies the provenance of the query digital object.

When the query object comprises a digital audio object generating the watermarking signal can involve processing the digital audio object to generate a spectrogram of the digital audio object and processing the spectrogram using the watermark decoding neural network to generate the watermarking signal for query digital object. This is described further later.

Figure 4:
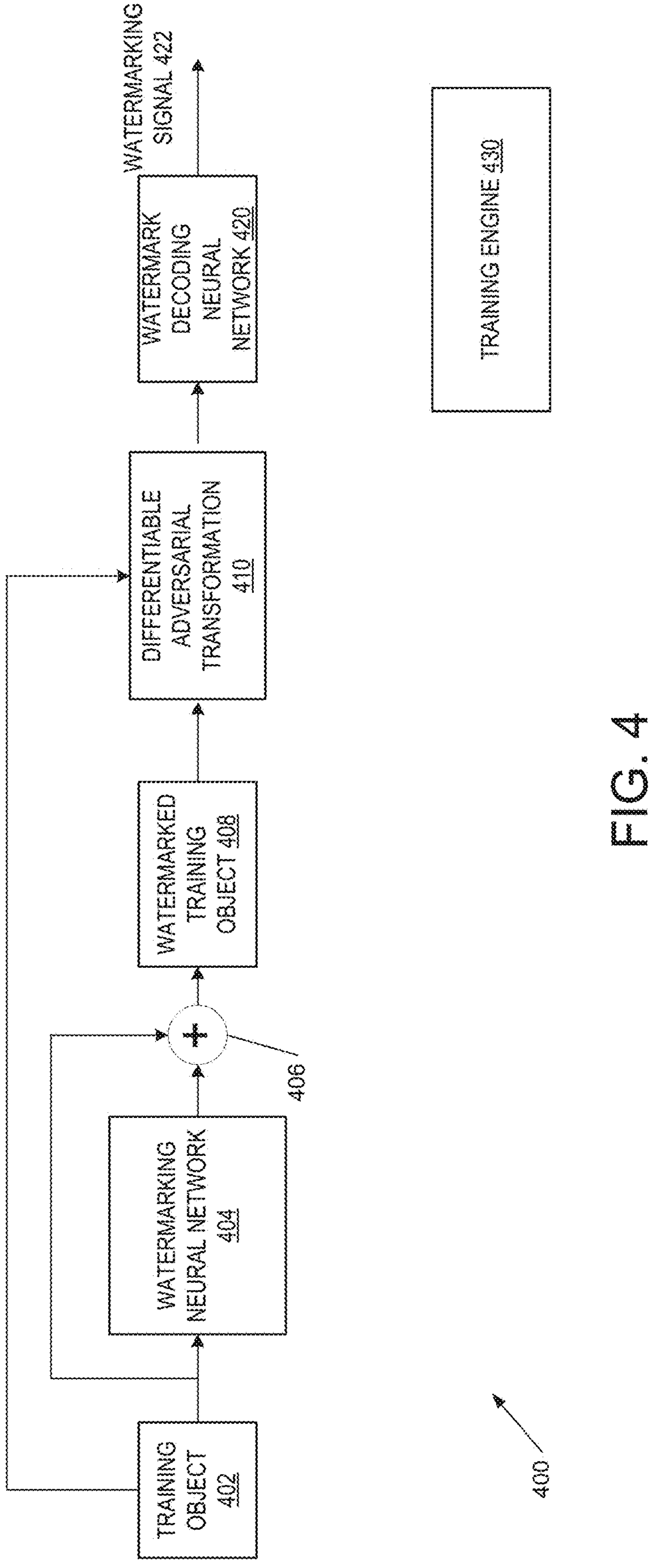
FIG. 4 shows an example of a watermarking system.

FIG. 4 shows an example of a watermarking system 400 that can be used for training a watermarking neural network and a watermark decoding neural network, such as the watermarking neural network 112 and the watermark decoding neural network 120 described above. The system 400 may be implemented as one or more computer programs on one or more computers in one or more locations.

The system 400 comprises a watermarking neural network 404 configured to process a digital object, e.g., a training object 402, in accordance with watermarking neural network trainable parameters, e.g., weights, to generate a watermarked (digital) training object 408. In implementations the watermarked training object 408 is obtained by combining an output of the watermarking neural network 404 with the training object 402, e.g., by elementwise summing 406.

In some implementations, but not necessarily, watermarking neural network 404 comprises a neural network with a U-Net architecture. In general, a U-Net architecture is characterized by having a series of neural network layers that first decrease a resolution of a representation of the digital object, e.g., using pooling operations, and then increase a resolution of a representation of the digital object, e.g., using up-sampling operations. The neural network layers can comprise, e.g., convolutional neural network layers or self-attention neural network layers (i.e., neural network layers incorporating a self-attention mechanism), or both. Skip connections, e.g., between layers of corresponding resolution, can be included.

In some implementations the watermarking neural network 404 is configured to encode a message, such as a random number or secret key. This may be done by combining the message, or an encoding of the message, with the input to one or more intermediate layers of the watermarking neural network 404, e.g., by summation or concatenation.

The system 400 also comprises a watermark decoding neural network 420, configured to process a digital object in accordance with watermark decoding neural network trainable parameters, to generate a watermarking signal 422.

In general, the watermarking signal 422 indicates whether a watermark is present in the digital object, i.e., whether or not the object is likely to be watermarked. The watermarking signal 422 can be as described above. As some examples, the watermarking signal 422 may comprise a binary signal that indicates whether or not a watermark was detected, or a score indicating a likelihood that a watermark is present (that may be compared with a threshold to make a determination of whether or not a watermark is present). Where the watermark is a multi-bit watermark the watermarking signal 422 may include a decoded version of a message encoded in the watermark when the watermark is present.

In some implementations, but not necessarily, watermark decoding neural network 420 comprises a neural network with a convolutional neural network architecture.

Some approaches to watermarking do not scale well when generating large numbers of digital objects. The training architecture of FIG. 4 enables implementations of the system 400 to have more watermark decoding neural network parameters than watermarking neural network parameters. Such an asymmetric architecture is advantageous because, after training, it facilitates rapid generation of watermarked digital objects, with a relatively low computational burden. This architecture also facilitates rapid training.

The system 400 is configured to apply a differentiable adversarial transformation 410 to the watermarked training object 408, to generate an alternative training object that provides the watermarked digital object processed by the watermark decoding neural network 420. An example of applying such a differentiable adversarial transformation is described later.

The system 400 includes a training engine 430 that is configured to jointly train the watermarking neural network 404 and the watermark decoding neural network 420.

The system 400 is trained using a plurality of the training digital objects 402. In general the system 400 can be trained using watermarked training objects and the original training objects from which the watermarked training objects were generated.

Figure 5:
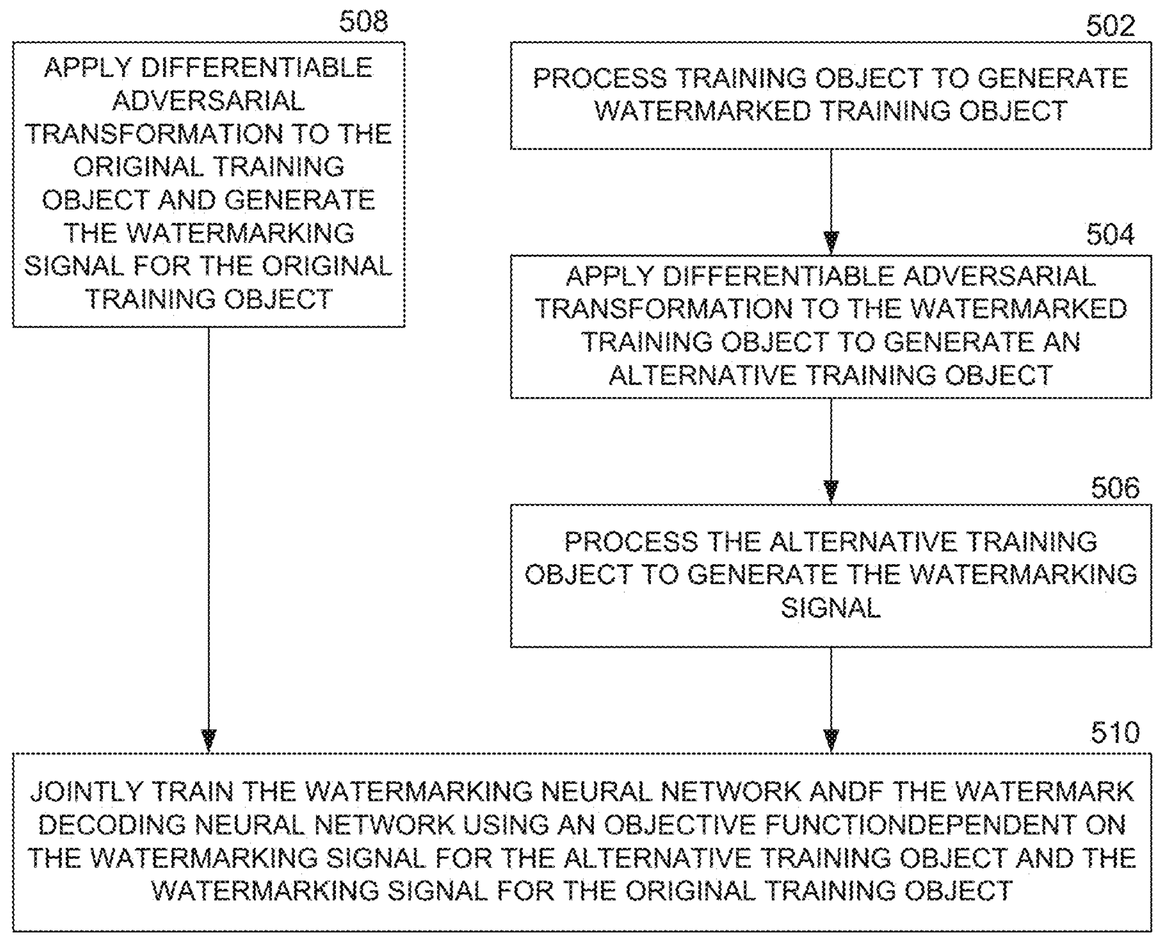
FIG. 5 is a flow diagram of an example process for jointly training a watermarking neural network and a watermark decoding neural network.

FIG. 5 is a flow diagram of an example process for jointly training the watermarking neural network 404 and the watermark decoding neural network 420 of FIG. 4. The process of FIG. 5 can be performed by a system of one or more computers located in one or more locations. The process of FIG. 5 can be performed for each of the plurality of training objects 402.

At step 502 the watermarking neural network 404 processes the training object 402, x, to generate a watermark that is applied to the training object to generate the watermarked training object 408, x'. As an example the watermarked digital object 408 may be generated as x'=x+g(x) where g(x) is a function applied to x by the watermarking neural network 404.

At step 504 the differentiable adversarial transformation, T(•), is applied to the watermarked training object to generate the alternative training object, î.

The alternative training object, x̂, is processed using the watermark decoding neural network 420, to generate the watermarking signal 422 for the alternative training object, d(x̂)=d(T(x+g(x))), where d(•) is a function applied by the watermarking decoding neural network 420 (step 506).

The (original) training object 402 is also processed using the differentiable adversarial transformation, and then using the watermark decoding neural network 420, to generate the watermarking signal 422 for the original training object 402 (step 508, performed before or after step 502). The watermarking signal 422 for the original training object 402 may be denoted d(T(x)). In some implementations the same transform T(•) is applied to both the original training object and to the watermarked training object; in some other implementations a different transform T(•) is used.

The watermarking neural network 404 and the watermark decoding neural network 420 are then jointly trained (end-to-end) by backpropagating gradients of a training objective function through the watermark decoding neural network, the differentiable adversarial transformation, and the watermarking neural network, to update the watermark decoding neural network parameters and the watermarking neural network parameters (step 510). The gradients are taken with respect to the watermark decoding neural network parameters and the watermarking neural network parameters. The watermark decoding neural network parameters and the watermarking neural network parameters include the weights and, in some cases, biases of the layers of the neural networks, e.g., the kernels of any convolutional layers in the networks, the weight matrices of any fully-connected layers in the networks, and so forth. The training engine 430 can determine gradients of the objective function using backpropagation techniques, and can update values of the parameters using the gradients, e.g., using any appropriate gradient descent optimization algorithm, e.g., Adam.

Backpropagating the gradients jointly trains the watermark decoding neural network and the watermarking neural network to optimize the objective function. The objective function measures an accuracy of the watermarking signal in identifying the watermarked training object as watermarked. Training the system in this way using the differentiable adversarial transformation helps the watermarking neural network to learn to apply watermarks that can be robustly detected by the watermark decoding neural network under an adversarial attack.

In some implementations the objective function comprises a first loss term and a second loss term. The first loss term has a value that is dependent on i) the watermarking signal for the alternative training object and on ii) a first training watermarking signal indicating that the watermarked training object is watermarked. The second loss term has a value that is dependent on i) the watermarking signal for the (original) training object and on ii) a second training watermarking signal indicating that the training object is not watermarked. The values of the first and second loss terms can be combined to obtain a value for the objective function, for backpropagating the gradients of the objective function.

In an example implementation the objective function includes a sum of the first term, dependent on the watermarking signal 422 for the alternative training object, d(T(x+g(x)) and the second term, dependent on the watermarking signal 422 for the original training object 402, d(T(x)). For example, the objective function may comprise a loss defined as:

$$l(d(T(x+g(x))),y)+l(d(T(x)),y')$$

where y and y' represent labels indicating, respectively, a ground truth watermarking signal for the alternative training object, and a ground truth watermarking signal for the original training object; and where l(•) represents a discrepancy between the watermarking signal 422 and the respective ground truth watermarking signal. For example, l(•) may comprise a cross-entropy loss. In some implementations y and y' may have different binary values 1 and 0, e.g., y=1 and y'=0. One or more other terms may also be included. For example, the objective function can include a term, e.g., a loss term, that encourages the watermarked training object to be similar to the training object. Such a term may be dependent on a metric of a similarity, or difference, between the training object and the watermarked training object (either before or after the adversarial perturbation). In general, any suitable metric may be used; merely as an example, where the object comprises an image such a term may be based on a structural similarity index measure (SSIM).

In some implementations the differentiable adversarial transformation, T(•) is a random transformation. In some implementations applying the differentiable adversarial transformation, T(•) involves applying one or more perturbations to values of the watermarked training object elements. The perturbations can be configured to change a value of the objective function to decrease the accuracy of the watermarking signal in identifying the watermarked training object as watermarked.

As a first particular example, applying the differentiable adversarial transformation, T(•) can involve, at each of one or more iteration steps, determining a perturbation for the value of each of the watermarked training object elements by adjusting the value of each element based on a gradient of the objective function with respect to the watermarked training object element. The same perturbation, T(•), may be applied to the elements of the original training object. In a variant the perturbations of the adversarial transformation, T(•), may instead be derived from the original training object. As an example, the perturbation applied to x' at an ith iteration may be obtained as $\delta^{i+1}=\delta^{i}+\alpha\nabla_{x'}$ l(d(T(x')), y) where, if necessary, $\delta^{i+1}$ is projected back into a support set for elements of x'.

As a second particular example the adversarial transformation, T(•) may be parameterized by a set of one or more parameters μ. The adversarial transformation applied may be denoted T(x, μ), with μ defining how the transform behaves, i.e., with the one or more parameters μ adjusting (characterizing) the transformation. Values of the one or more parameters μ may be adjusted based on a gradient of the objective function with respect to the parameter(s). Thus the differentiable adversarial transformation, T(x, μ) can be determined by, at each of one or more iteration steps, determining a perturbation for a value of each of one or more parameters characterizing the differentiable adversarial transformation, T(x, μ), by adjusting the value of each parameter based on a gradient of the objective function with respect to the parameter. For example, the perturbation applied to μ at an ith iteration may be obtained as $\mu^{i+1}=\mu^{i}+\alpha\nabla_{\mu}$l(d(T(x, μ), y) where, if necessary, $\mu^{i+1}$ is projected back into a support set for the parameter(s) μ, e.g., into a "reasonable range" for the relevant parameter(s) of the transformation.

Merely as an illustration of this second particular example, consider a case where the digital object comprises an image, and where an adversarial perturbation to which the system should be robust comprises a change in brightness of the image. Then the transform T(x, μ) could, say, be defined as min(max(image+μ, 0), 1) where image denotes pixel values of the image, in this example in the range [0,1], and where u is a scalar value. Other random transformations, e.g., as previously described, can be applied in a corresponding manner.

In general the techniques described herein are not limited to any particular size of digital object. When the digital object comprises an image, it may be resized to a target size, e.g., one suitable for the system, e.g., an image size for which the system has been trained, watermarked, and then re-sized back to the original size. The watermarking techniques described herein are robust to such transformations.

As previously mentioned, a term may be included in the objective function may be included to encourage a watermark to be imperceptible, e.g., a term based on a metric of a difference between watermarked and unwatermarked versions of the digital object. Also or instead in some implementations, e.g., where the digital object is an audio data object, a (maximum permitted) degree of the adversarial perturbation may be limited to limit perceptibility of the watermark.

In implementations where the training object comprises an audio data object, processing the training object generating the watermarked training object can involve processing the training object to generate a spectrogram of the training object, processing the spectrogram using the watermarking neural network to generate a watermark for the training object, and combining the watermark and the spectrogram to obtain a watermarked spectrogram. The watermarked training object may then comprise the watermarked spectrogram and/or a watermarked version of the training object obtained from the watermarked spectrogram. The adversarial transformation can be applied to the watermarked spectrogram or to the watermarked version of the training object obtained from the watermarked spectrogram. Optionally the spectrogram may be adapted to a sampling rate of an audio signal from which the (digital) audio data object is derived. This is describe further below.

In a test watermarking images, training the watermarking system as described above resulted in an improvement in watermark detection over a previous technique, from less than 50% to over 95% TPR at 0.1% FPR.

Figure 6:
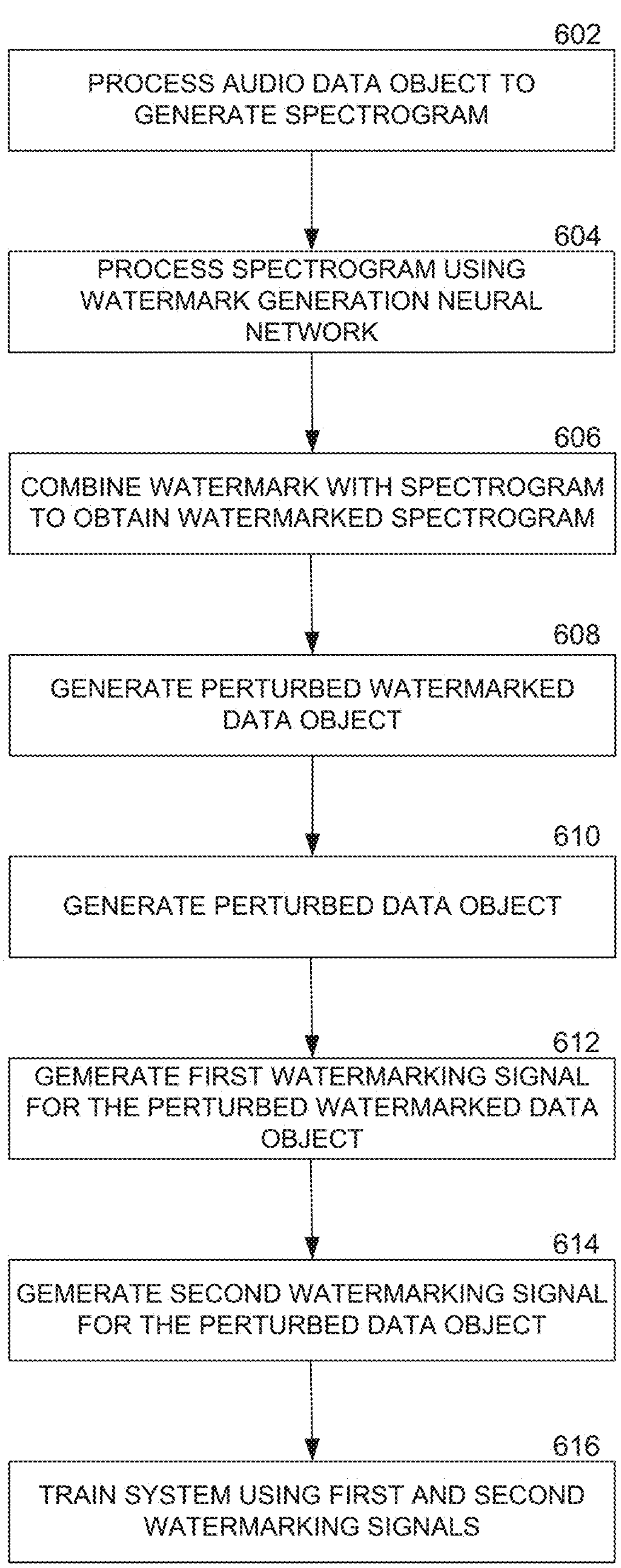
FIG. 6 is a flow diagram of another example process for jointly training a watermarking neural network and a watermark decoding neural network.

FIG. 6 is a flow diagram of another example process for jointly training the watermarking neural network 404 (i.e., a watermark generation neural network), and the watermark decoding neural network 420 of the watermarking system 400 of FIG. 4. The process of FIG. 6 can be performed by a system of one or more computers located in one or more locations. The process of FIG. 6 can be performed for each of the plurality of training objects 402, and is adapted for use when a training object comprises an audio data object. The steps of FIG. 6 need not all be performed in the order shown; some of the steps may be performed in parallel.

The process of FIG. 6 is performed for a plurality of audio data objects each comprising a representation of an audio signal. The process involves processing an audio data object to generate a spectrogram of the audio data object (step 602), in particular by performing a time-frequency domain transform on the audio signal to generate a frequency domain representation of the audio signal for a range of frequencies.

As one example the time-frequency domain transform can be a short-time Fourier transform (STFT); other time-frequency domain transforms can be used.

In general, a spectrogram can be an image that represents the time-frequency domain transform. More particularly it may comprise a representation of the audio data item with time on one axis, e.g., a horizontal axis and frequency on another axis, e.g., a vertical axis. The location of a pixel of the image along the time axis can represent a time position in the audio data object; the location along the frequency axis can represent a frequency at that time; the value of the pixel, e.g., a luminance or color value, can represent a component of the audio signal at that time and at that frequency, e.g., a magnitude and/or a phase of the audio signal. In some time-frequency domain transforms the component of the audio signal is represented by a complex number. Thus, generally, the spectrogram can represent a changing spectrum of the audio signal over time.

The spectrogram (image) is processed using a watermark generation neural network, i.e., the watermarking neural network 404, to generate a watermark for the audio data object (step 604), in implementations also in the form of an image.

The watermark (image) is combined with, e.g., added to, the spectrogram (image) to obtain a watermarked spectrogram (image) (step 606).

A transformation, in particular an adversarial transformation, is applied to one or both of i) a watermarked version of the audio data object obtained by converting the watermarked spectrogram to a watermarked version of the audio data object, and ii) the watermarked spectrogram, to perturb the watermark to generate a perturbed watermarked data object (step 608). That is the method may, but need not, involve converting the watermarked spectrogram to the watermarked version of the audio data object (since the watermark decoding neural network processes a spectrogram).

In general, converting a spectrogram, e.g., the watermarked spectrogram to (time domain) audio data, e.g., to the watermarked version of the audio data object, involves the applying the inverse of the time-frequency domain transform, i.e., a frequency-time domain transform. The particular inverse transform depends on what time-frequency domain transform has been used; e.g., an inverse STFT may be performed.

The adversarial transformation can be applied in the time domain, to the watermarked version of the audio data object, or in the frequency domain, to the watermarked spectrum, or both. In general, the adversarial transformation can be any perturbation that changes the audio data object, in particular to make detection of the watermark more difficult. It can be useful for training if the adversarial transformation is a differentiable adversarial transformation. Some examples of adversarial transformations of the audio data object are given later.

The adversarial transformation is also applied to one or both of the audio data object and the spectrogram of the audio data object to generate a perturbed data object (step 610). Again the adversarial transformation can be applied in the time domain or in the frequency domain.

The perturbed watermarked data object is processed by the watermark decoding neural network to generate a first (training) watermarking signal that indicates whether or not the perturbed watermarked data object is predicted to be watermarked (step 612). For example, the first watermarking signal can predict (identify) when the perturbed watermarked data object is watermarked.

The perturbed data object is processed by the watermark decoding neural network to generate a second (training) watermarking signal, that indicates whether or not the perturbed data object is predicted to be watermarked (step 614). For example, the second watermarking signal can predict (identify) when the perturbed data object is watermarked.

The watermark decoding neural network and the watermark generation neural network are trained jointly (end-to-end) using the first watermarking signal and the second watermarking signal (step 616). In particular the watermark decoding neural network and the watermark generation neural network are trained to distinguish between the perturbed watermarked data object and the perturbed data object.

In implementations, jointly training the watermark decoding neural network and the watermark generation neural network comprises backpropagating gradients of a classification-based objective function, into both the watermark decoding neural network and into the watermark generation neural network.

In implementations the objective function has a value that depends on classifying the first watermarking signal as indicating that the perturbed watermarked data object is watermarked and classifying the second watermarking signal as indicating that the perturbed data object as not watermarked. In an example implementation the objective function comprises a cross-entropy loss for correctly classifying each signal.

In general, the adversarial transformation can be selected as a transformation that the watermark should be robust to. In general implementations multiple different adversarial transformations can be applied, e.g., by using different adversarial transformations for different audio data objects.

For an audio data object, example adversarial transformations can include pitch/time/speed or frequency modification, e.g., filtering or masking; amplitude modification; noise level modification, e.g., adding noise or removing signal; applying audio compression/decompression, and so forth. The adversarial transformation may be applied to the audio data object and/or to the spectrogram of the audio data object.

As previously described, the watermarking neural network 404, i.e., the watermark generation neural network, may comprise a U-net. This can facilitate applying the watermark generation neural network to a continuous audio signal where the watermark generation neural network slides or steps along a spectrogram of the audio signal.

The watermark decoding neural network 420 may comprise a convolutional neural network as previously described.

Such implementations facilitate, e.g., processing each time step of an audio signal using the watermark decoding neural network to generate an output that, at each time step, predicts whether or not a watermark is present.

In implementations each audio data object comprises a digital representation of the audio signal obtained by sampling the audio signal in the time domain at a signal sampling rate. The method may then include adapting the spectrogram to the sampling rate of the audio signal to compensate for different sampling rates of different audio data objects.

In implementations the time-frequency domain transform is performed on a succession of frames of the audio data object to generate the spectrogram. Each such frame defines a time window on the audio data object comprising a plurality of audio signal samples. Adapting the spectrogram to the sampling rate of the audio signal can then involve comprises changing a number of audio signal samples in a frame such that, for different sampling rates, each frame has the same time duration. Details of a particular example process for this are described later.

Figure 7A:
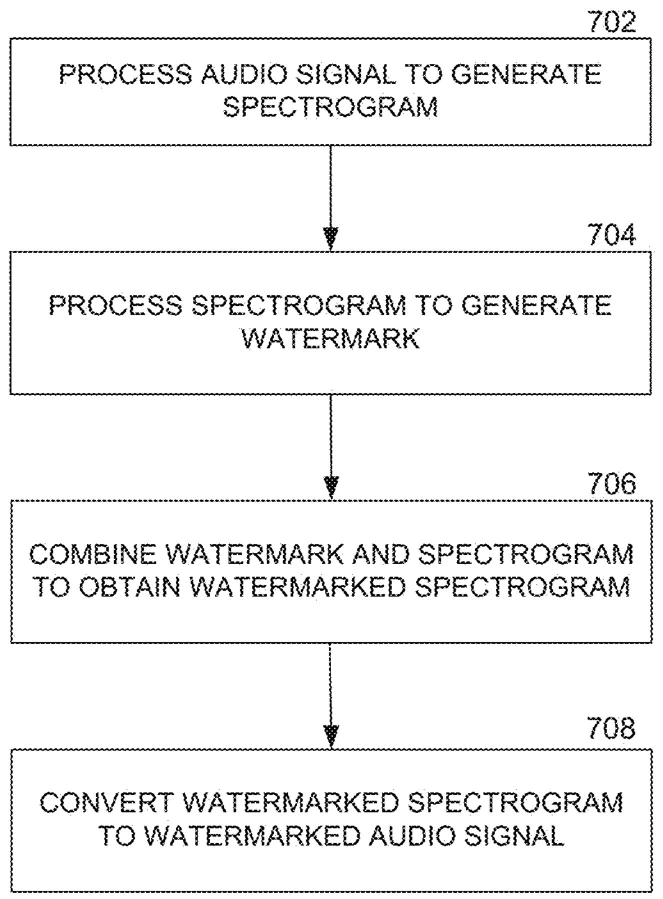
FIG. 7A is a flow diagram of an example process for watermarking an audio signal.

FIG. 7A is a flow diagram of an example process for watermarking an audio signal. The process of FIG. 7A can be performed by a system of one or more computers located in one or more locations, e.g., by a trained watermark generation neural network such as the watermarking neural network 404 of FIG. 4 after training as described above.

The audio signal is processed to generate a spectrogram of the audio signal (step 702), in particular by performing a time-frequency domain transform on the audio signal to generate a frequency domain representation of the audio signal for a range of frequencies.

The spectrogram is processed using a trained watermark generation neural network, e.g., a watermark generation neural network that has been trained as described above, to generate a watermark for the audio signal (step 704).

The watermark and the spectrogram are then combined, e.g., by adding, to obtain a watermarked spectrogram (step 706), and the watermarked spectrogram is converted to a watermarked version of the audio signal (step 708).

In general, the audio signal comprises a digital representation of the audio signal obtained by sampling the audio signal in the time domain at a signal sampling rate. Optionally the method may include adapting the spectrogram to the sampling rate of the audio signal (step 704).

In implementations the time-frequency domain transform is performed on a succession of frames of the audio signal to generate the spectrogram, each frame defining a time window on the audio signal comprising a plurality of audio signal samples. Adapting the spectrogram to the sampling rate of the audio signal may involve changing a number of audio signal samples in a frame such that, for different sampling rates, each frame has the same time duration.

In implementations the watermark generation neural network has been trained at a sampling rate (or maximum sampling rate) that is referred to as a reference sampling rate. In general, performing the time-frequency domain transform on the audio signal generates a frequency domain representation of the audio signal for a range of frequencies. When the sampling rate of the audio signal is higher than the reference sampling rate a portion of the frequency domain representation is selected that corresponds to frequencies up to a reference maximum frequency, where the reference maximum frequency represents, i.e., corresponds to, the reference sampling rate. For example, the reference maximum frequency may be a maximum frequency that can be represented when sampling at the reference sampling rate, e.g., according to the Nyquist criterion. Since the sampling rate of the audio signal is higher than the reference sampling rate the reference maximum frequency is within the range of frequencies of the frequency domain representation of the audio signal.

The process can generate the spectrogram of the audio signal, and the watermark for the audio signal, from the time-frequency domain transform (only) for frequencies up to the reference maximum frequency. The watermark and the spectrogram can be combined to obtain the watermarked spectrogram, and the watermarked spectrogram and a portion of the frequency domain representation for frequencies above the reference maximum frequency can be combined to determine a combined spectrogram that includes the frequencies not represented in the watermarked spectrogram. The relevant portion of the frequency domain representation comprises frequencies above the reference maximum frequency in the range of frequencies from the time-frequency domain transform. The combined spectrogram can then be converted to time domain audio to obtain the watermarked version of the audio signal.

When the sampling rate is lower than a reference sampling rate at which the watermark generation neural network has been trained the missing frequencies, i.e., those which could be represented by the watermarked spectrogram but which are not available from in the frequency domain audio signal, can be represented by zeros.

For example, the time-frequency domain transform on the audio signal can generate a frequency domain representation of the audio signal for a range of frequencies, and the frequency domain representation can be padded with zeros for frequencies above a maximum frequency defined by the sampling rate, up to the reference maximum frequency, to generate a padded frequency domain representation of the audio signal. The spectrogram of the audio signal, and the watermark for the audio signal, can then be generated from the padded frequency domain representation of the audio signal.

Figure 7B:
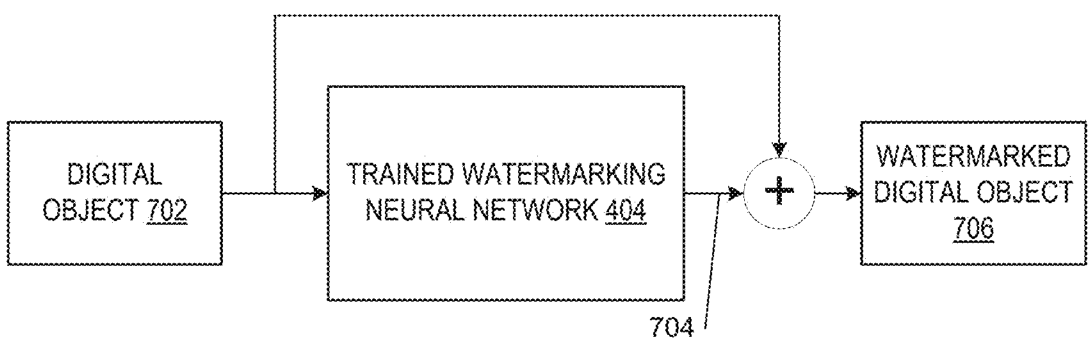
FIG. 7B illustrates use of a trained watermarking neural network to watermark a digital object.

FIG. 7B shows use of the trained watermarking neural network 404 to watermark a digital object such as a digitized audio signal. The digital object 702 is provided as an input to the trained watermarking neural network 404, that processes the digital object 702 to generate a watermark 704 for the digital object, that is then combined with the digital object 702 to obtain a watermarked version 706 of the digital object.

Figure 8A:
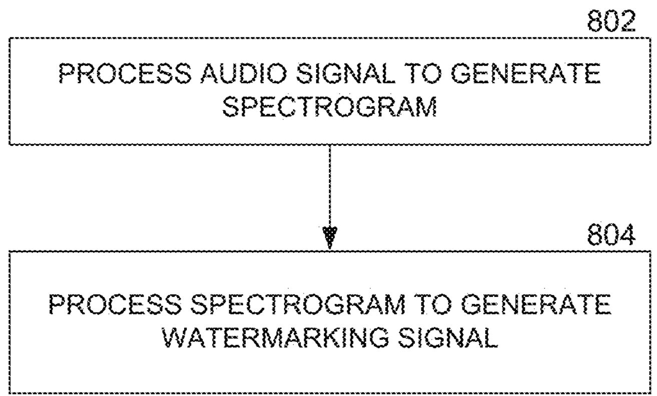
FIG. 8A is a flow diagram of an example process for identifying the presence of a watermark in an audio signal.

FIG. 8A is a flow diagram of an example process for identifying the presence of a watermark in an audio signal. The process of FIG. 8A can be performed by a system of one or more computers located in one or more locations, e.g., by the watermark decoding neural network 420 of FIG. 4 after training as described above.

The audio signal is processed to generate a spectrogram of the audio signal (step 802), in particular by performing a time-frequency domain transform on the audio signal to generate a frequency domain representation of the audio signal for a range of frequencies. The spectrogram is then processed using a trained watermark decoding (watermark identification) neural network to generate a watermarking signal for the audio signal (step 804). The watermarking signal indicates whether or not the audio signal is predicted to be watermarked.

Optionally when the sampling rate is higher than the above described reference sampling rate the process can involve selecting a portion of the frequency domain representation for frequencies up to a reference maximum frequency within the range of frequencies that represents the above described reference sample rate. The spectrogram of the audio signal (for processing using the watermark decoding neural network) can be generated from the time-frequency domain transform (only) for frequencies up to the reference maximum frequency.

When the sampling rate is lower than the above described reference sampling rate the process can involve padding the frequency domain representation of the audio signal with zeros for frequencies above a maximum frequency defined by the sampling rate up to a reference maximum frequency that represents the reference sampling rate, to generate a padded frequency domain representation of the audio signal. The spectrogram of the audio signal, and the watermark for the audio signal, can then be generated from the padded frequency domain representation of the audio signal.

Figure 8B:
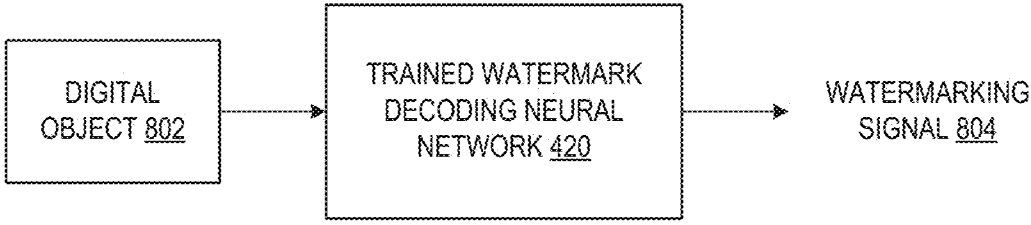
FIG. 8B illustrates of a trained watermark decoding neural network to predict whether or not a digital object is watermarked.

FIG. 8B shows use of the trained watermark decoding neural network 420 to predict whether or not a digital object such as a digitized audio signal is watermarked. The digital object 802 is provided as an input to the trained watermark decoding neural network 420, that processes the digital object 802 to generate a watermarking signal 804 for the digital object, that predicts whether or not the digital object 802 has been watermarked, in particular as described above.

One example technique for adapting the spectrogram to the sampling rate of the audio signal is now described, in which the time-frequency domain transform is a short-time Fourier transform (STFT). The STFT transform has a frame length, W, that defines the number of samples in a frame on, and a frame step, S, corresponding to the number of samples to shift by between frames. For example, an STFT with parameters W=1024 and S=512, would result in a spectrogram that contain frequency responses computed on, in the first frame (t=0), samples from 0 to 1024, in the second frame (t=1), samples from 512 to 1576, and so forth.

The STFT converts a time-domain signal, s, a tensor of size T, into a time-frequency representation, i.e., spectrogram, I, a tensor of size [t, F]. The second dimension of the spectrogram corresponds to frequency. In a given frame (fixed t), the content of the spectrogram I[t, F] is defined by a convolution between the window of samples that has been selected, i.e., the frame, and a frequency dependent filter. These frequency dependent filters are arranged in order of increasing frequency, e.g., constant, one period over the window, two periods over the window, and so forth up to (n/2) periods over the window, where n is the number of samples in a frame.

It is helpful if the audio signal processing is invariant to the sampling rate. As an example, it is helpful if the same spectrogram, Ia, is obtained from an audio signal encoded at sample rate of 24 KHz (sample_rate_a), as the same spectrogram, Ib, obtained from the audio signal encoded at a sample rate of 48 KHz (sample_rate_b), i.e., if Ia=Ib.

This can be achieved by modifying the parameters of the spectrogram. A given frame of the spectrogram Ia will contain W samples, corresponding to a duration of (W/sample_rate_a) seconds. If this duration were encoded at the sample rate of sample_rate_b, it would represent sample_rate_b*(W/sample_rate_a) samples. Thus to obtain an equivalent W' that would be needed to have frames of matching length, the frame length can be multiplied by the ratio of the sampling rates. The same logic applies to the frame step, S, to obtain the same time difference between adjacent frames irrespective of the sampling rate.

Which frequencies are available in the spectrogram depends on the number of points there are in the window, and optionally the processes described above may be adapted to these frequencies. Assume a reference sample rate at which the system model has been trained, and consider how to adapt to different sample rates. If the sample rate is higher than the reference sample rate there are more points in the window than are needed, i.e., it is possible to compute all the frequencies present when using reference sample rate, and some additional frequencies. In this case the process may compute all the frequencies that it can and split them into two parts, the frequencies that the model is able to use, which are modified with a watermark, passed to the decoder, and so forth; and the frequencies that the model is not able to handle, which are left. When the (time-domain) audio signal is reconstructed, using a frequency-time domain transform, the two sets of frequencies can be re-concatenated to avoid loss of any of the part of the signal that was encoded in the higher frequencies.

If the sample rate is higher than the reference sample rate there are fewer points in the window than are needed and the spectrogram can only be computed for a reduced set of frequencies. In this case that frequencies that are not available can be represented by zeros.

In a test watermarking audio data objects, training the watermarking system as described above for audio data objects can provide imperceptible watermarks with >98% TPR at 0.1% FPR, even when adversarial perturbations are applied to the audio.

The training data for the systems and neural networks described herein can simply comprise a set of digital objects of the desired type to watermark, e.g., text, images, audio, or a combination thereof. There are many publicly available datasets of images, audio and so forth, e.g., ImageNet for images, AudioSet for audio, or a version of the Common Crawl dataset for text. The number of trainable parameters, e.g., weights, of the watermarking neural network (watermark generation neural network) and of the watermark decoding neural can be varied depending on, e.g., the size of the digital objects processed, and their architecture can also vary. Techniques for determining a number of training data items to use are well known, e.g., based on performance of the system on a held-out set of data items and/or based on monitoring a value of the objective, e.g., loss function.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The typical elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Further aspects of the invention are defined in the following clauses:

1. A computer-implemented method of training a watermarking system comprising a watermark generation neural network and a watermark decoding neural network, comprising: for a plurality of audio data objects each comprising a representation of an audio signal: processing the audio data object to generate a spectrogram of the audio data object; processing the spectrogram using the watermark generation neural network to generate a watermark for the audio data object; combining the watermark and the spectrogram to obtain a watermarked spectrogram; applying an adversarial transformation to one or both of a watermarked version of the audio data object obtained by converting the watermarked spectrogram to a watermarked version of the audio data object, and the watermarked spectrogram, to perturb the watermark to generate a perturbed watermarked data object; applying an adversarial transformation to one or both of the audio data object and the spectrogram of the audio data object to generate a perturbed data object; processing the perturbed watermarked data object using the watermark decoding neural network to generate a first watermarking signal that indicates whether or not the perturbed watermarked data object is predicted to be watermarked; processing the perturbed data object using the watermark decoding neural network to generate a second watermarking signal that indicates whether or not the perturbed data object is predicted to be watermarked; jointly training the watermark decoding neural network and the watermark generation neural network, using the first watermarking signal and the second watermarking signal, to distinguish between the perturbed watermarked data object and the perturbed data object.

2. The method of clause 1, wherein jointly training the watermark decoding neural network and the watermark generation neural network comprises backpropagating gradients of a classification-based objective function that has a value that depends on classifying the first watermarking signal as indicating that the perturbed watermarked data object is watermarked and classifying the second watermarking signal as indicating that the perturbed data object as not watermarked.

3. The method of clause 1 or 2, comprising applying the adversarial transformation to the spectrogram of the audio data object to generate the perturbed data object, wherein applying the adversarial transformation comprises changing one or more of a pitch, speed, frequency content, or noise level in the audio data object or in the spectrogram of the audio data object.

4. The method of any one of clauses 1-3, wherein each audio data object comprises a digital representation of the audio signal obtained by sampling the audio signal in the time domain at a signal sampling rate, the method further comprising: adapting the spectrogram to the sampling rate of the audio signal to compensate for different sampling rates of different audio data objects.

5. The method of clause 4, wherein processing the audio data object to generate a spectrogram of the audio data object comprises: performing a time-frequency domain transform on a succession of frames of the audio data object to generate the spectrogram, each frame defining a time window on the audio data object comprising a plurality of audio signal samples; and wherein adapting the spectrogram to the sampling rate of the audio signal comprises changing a number of audio signal samples in a frame such that, for different sampling rates, each frame has the same time duration.

6. A computer-implemented method of watermarking an audio signal, the method comprising: processing the audio signal to generate a spectrogram of the audio signal; processing the spectrogram using a watermark generation neural network to generate a watermark for the audio signal; combining the watermark and the spectrogram to obtain a watermarked spectrogram; converting the watermarked spectrogram to a watermarked version of the audio signal.

7. The method of clause 6, wherein the audio signal comprises a digital representation of the audio signal obtained by sampling the audio signal in the time domain at a signal sampling rate, the method further comprising: adapting the spectrogram to the sampling rate of the audio signal.

8. The method of clause 7, wherein processing the audio signal to generate the spectrogram of the audio signal comprises: performing a time-frequency domain transform on a succession of frames of the audio signal to generate the spectrogram, each frame defining a time window on the audio signal comprising a plurality of audio signal samples; and wherein adapting the spectrogram to the sampling rate of the audio signal comprises changing a number of audio signal samples in a frame such that, for different sampling rates, each frame has the same time duration.

9. The method of any one of clauses 7-8, further comprising, when the sampling rate is higher than a reference sampling rate at which the watermark generation neural network has been trained: performing a time-frequency domain transform on the audio signal to generate a frequency domain representation of the audio signal for a range of frequencies; selecting a portion of the frequency domain representation for frequencies up to a reference maximum frequency within the range of frequencies that represents the reference sampling rate; generating the spectrogram of the audio signal, and the watermark for the audio signal, from the time-frequency domain transform for frequencies up to the reference maximum frequency; combining the watermark and the spectrogram to obtain the watermarked spectrogram; combining the watermarked spectrogram and a portion of the frequency domain representation for frequencies above the reference maximum frequency in the range of frequencies to determine a combined spectrogram; converting the combined spectrogram to the watermarked version of the audio signal.

10. The method of any one of clauses 7-8, further comprising, when the sampling rate is lower than a reference sampling rate at which the watermark generation neural network has been trained: performing a time-frequency domain transform on the audio signal to generate a frequency domain representation of the audio signal for a range of frequencies; padding the frequency domain representation of the audio signal with zeros for frequencies above a maximum frequency defined by the sampling rate up to a reference maximum frequency that represents the reference sampling rate, to generate a padded frequency domain representation of the audio signal; and generating the spectrogram of the audio signal, and the watermark for the audio signal, from the padded frequency domain representation of the audio signal.

11. A computer-implemented method of identifying the presence of a watermark in an audio signal, the method comprising: processing the audio signal to generate a spectrogram of the audio signal; and processing the spectrogram using a watermark decoding neural network to generate a watermarking signal for the audio signal, wherein the watermarking signal predicts whether or not the audio signal is watermarked.

12. The method of clause 11, further comprising, when the sampling rate is higher than a reference sampling rate at which the watermark decoding neural network has been trained: performing a time-frequency domain transform on the audio signal to generate a frequency domain representation of the audio signal for a range of frequencies; selecting a portion of the frequency domain representation for frequencies up to a reference maximum frequency within the range of frequencies that represents the reference sample rate; generating the spectrogram of the audio signal, for processing using the watermark decoding neural network, from the time-frequency domain transform for frequencies up to the reference maximum frequency.

13. The method of clause 11 or 12, further comprising, when the sampling rate is lower than a reference sampling rate at which the watermark generation neural network has been trained: performing a time-frequency domain transform on the audio signal to generate a frequency domain representation of the audio signal for a range of frequencies; padding the frequency domain representation of the audio signal with zeros for frequencies above a maximum frequency defined by the sampling rate up to a reference maximum frequency that represents the reference sampling rate, to generate a padded frequency domain representation of the audio signal; and generating the spectrogram of the audio signal, and the watermark for the audio signal, from the padded frequency domain representation of the audio signal.

14. A computer-implemented method of training a watermarking system for watermarking a digital object, the watermarking system comprising: a watermarking neural network configured to process a digital object, in accordance with watermarking neural network parameters, to generate a watermarked digital object, and a watermark decoding neural network configured to process a watermarked digital object, in accordance with watermark decoding neural network parameters, to generate a watermarking signal; the method comprising, for each of a plurality of training objects: processing the training object using the watermarking neural network to generate a watermarked training object; applying a differentiable adversarial transformation to the watermarked training object to generate an alternative training object; processing the alternative training object using the watermark decoding neural network to generate the watermarking signal for the alternative training object; and backpropagating gradients of an objective function through the watermark decoding neural network, the differentiable adversarial transformation, and the watermarking neural network, to update the watermark decoding neural network parameters and the watermarking neural network parameters and jointly train the watermark decoding neural network and the watermarking neural network to optimize the objective function, wherein the gradients are taken with respect to the watermark decoding neural network parameters and the watermarking neural network parameters, wherein the objective function measures an accuracy of the watermarking signal in identifying the watermarked training object as watermarked.

15. The method of clause 14, wherein the watermarked training object comprises a plurality of watermarked training object elements, and wherein applying the differentiable adversarial transformation comprises: applying one or more perturbations to values of the watermarked training object elements, wherein the perturbations change a value of the objective function to decrease the accuracy of the watermarking signal in identifying the watermarked training object as watermarked.

16. The method of clause 14 or 15, wherein the differentiable adversarial transformation has one or more parameters that adjust the transformation, and wherein the method further comprises: iteratively determining a perturbation for the value of each of the parameters by, at one or more iteration steps: adjusting the value of each of the parameters based on a gradient of the objective function with respect to the parameter.

17. The method of any one of clauses 14-16, wherein the objective function comprises a first loss term and a second loss term, the method further comprising: processing the training object using the watermark decoding neural network to generate the watermarking signal for the training object; determining a value for the first loss term dependent on the watermarking signal for the alternative training object and a first training watermarking signal indicating that the watermarked training object is watermarked; determining a value for the second loss term dependent on the watermarking signal for the training object and a second training watermarking signal indicating that the watermarked training object is not watermarked; combining the value for the first loss term and the value for the second loss term to obtain a value for the objective function for backpropagating the gradients of the objective function.

18. The method of any one of clauses 14-17, wherein the digital object and the training objects each include an image.

19. The method of any one of clauses 14-18, wherein the digital object and the training objects each include a digital audio object.

20. The method of clause 19, wherein processing the training object using the watermarking neural network to generate a watermarked training object comprises: processing the training object to generate a spectrogram of the training object; and processing the spectrogram using the watermarking neural network to generate a watermark for the training object; and combining the watermark and the spectrogram to obtain a watermarked spectrogram, wherein the watermarked training object comprises the watermarked spectrogram or a watermarked version of the training object obtained from the watermarked spectrogram; and wherein applying the differentiable adversarial transformation to the watermarked training object to generate the alternative training object comprises applying the differentiable adversarial transformation to the watermarked spectrogram or to the watermarked version of the training object obtained from the watermarked spectrogram.

21. The method of clause 20, wherein the training object comprises a digital representation of an audio signal obtained by sampling the audio signal in the time domain at a signal sampling rate, the method further comprising: adapting the spectrogram to the sampling rate of the audio signal to compensate for different sampling rates of different training objects.

22. The method of any one of clauses 14-21, wherein the watermarking neural network comprises a neural network with a U-Net architecture, and/or wherein the watermark decoding neural network comprises a neural network with a convolutional neural network architecture.

23. The method of any one of clauses 14-22, wherein the watermark decoding neural network has more trainable parameters than the watermarking neural network.
24. The method of any one of clauses 14-23, wherein the watermarking signal zero, one, or more than one, watermark message bits.
25. A computer-implemented method of watermarking a digital object, the method comprising: processing the digital object or data representing the digital object using a watermark generation neural network trained by the method of any one of clauses 14-24, to generate a watermark for the digital object; and generating a watermarked version of the digital object from a combination of the watermark and the digital object or the data representing the digital object.
26. A computer-implemented method of identifying the presence of a watermark in a digital object, the method comprising: processing the digital object or data representing the digital object using a watermark decoding neural network trained by the method of any one of clauses 14-24, to generate a watermarking signal for the digital object, wherein the watermarking signal predicts whether or not the digital object is watermarked.
27. A computer implemented method of verifying the provenance of a digital object, the method comprising: maintaining an object verification system comprising: a first interface to receive a digital object or a request to generate a digital object; a second interface to provide a watermarked digital object for use; an embedding neural network configured to process the digital object to generate an embedding of the digital object; and an object verification database configured to store at least the embedding of the digital object; the method further comprising: receiving a query digital object for verification; processing the query digital object using a watermark decoding neural network to generate a watermarking signal for the query digital object; processing the query digital object using the embedding neural network to generate a query embedding of the query digital object; interrogating the object verification database using the query embedding to determine a set of one or more similarity scores for a corresponding set of one or more stored embeddings of digital objects that are similar to the query digital object; and verifying a provenance of the query digital object based on a combination of the watermarking signal and the set of one or more similarity scores.
28. The method of clause 27, wherein the query object comprises a digital audio object, and wherein processing the query digital object using the watermark decoding neural network to generate a watermarking signal for the query digital object comprises: processing the digital audio object to generate a spectrogram of the digital audio object; and processing the spectrogram using the watermark decoding neural network to generate the watermarking signal for query digital object.
29. The method of clause 27 or 28, wherein the object verification system is an object generation and verification system, wherein the request comprises a request to generate the digital object, wherein maintaining the object verification system (100) further comprises maintaining a generative neural network (108) configured to process the request to generate the digital object (109) in accordance with the request; the method further comprising: receiving a request (103) to generate the digital object; processing the request using the generative neural network to generate the digital object (109); processing the digital object (109) using the watermarking neural network to generate the watermarked digital object (113); providing the watermarked digital object for use; processing the digital object (109) using the embedding neural network to generate the embedding of the digital object (115); storing the embedding of the digital object (115) in the object verification database; and verifying the provenance of the query digital object as generated by the object generation and verification system conditional upon the query embedding (119) matching the embedding of the digital object (115) stored in the object verification database.
30. The method of clause 29, wherein the digital object comprises a digital audio object, and wherein processing the digital object using the watermarking neural network to generate the watermarked digital object comprises: processing the digital audio object to generate a spectrogram of the digital audio object; processing the spectrogram using a watermark generation neural network to generate a watermark for the digital audio object; combining the watermark and the spectrogram to obtain a watermarked spectrogram; and converting the watermarked spectrogram to the watermarked digital object.
31. The method of clause 29 or 30, further comprising: storing the digital object in the object verification database; and using the stored digital object to detect attempted removal of a watermark from the query digital object.
32. The method of any one of clauses 27-31, wherein the watermarking neural network and the watermark decoding neural network have been jointly trained to generate the watermarking signal under an adversarial perturbation of the watermarked digital object.
33. A computer implemented method of generating a digital object with a verifiable provenance, the method comprising: maintaining an object generation and verification system comprising: a first interface to receive a request to generate a digital object; a generative neural network configured to process the request to generate a digital object in accordance with the request; a watermarking neural network configured to process the digital object to generate a watermarked digital object; a second interface to provide the watermarked digital object for use; an embedding neural network configured to process the digital object to generate an embedding of the digital object; and an object verification database configured to store at least the embedding of the digital object; the method further comprising: receiving a request to generate the digital object; processing the request using the generative neural network to generate the digital object in accordance with the request; processing the digital object using the watermarking neural network to generate a watermarked digital object; providing the watermarked digital object for use; processing the digital object using the embedding neural network to generate the embedding of the digital object; and storing the embedding of the digital object in the object verification database; wherein the provenance of the digital object is verifiable by: generating a query embedding of a query digital object using the embedding neural network, interrogating the object verification database using the query embedding to determine a set of one or more similarity scores for a corresponding set of one or more stored embeddings of digital objects that are similar to the query digital object, and verifying the provenance of the query digital object based on a combination of a watermarking signal indicating watermarking of the query digital object and the set of one or more similarity scores.

34. The method of clause 33, wherein the digital object comprises a digital audio object; wherein the query object comprises a digital audio object; wherein processing the query digital object using the watermark decoding neural network to generate a watermarking signal for the query digital object comprises: processing the digital audio object to generate a spectrogram of the digital audio object; and processing the spectrogram using the watermark decoding neural network to generate the watermarking signal for query digital object; and wherein processing the digital object using the watermarking neural network to generate the watermarked digital object comprises: processing the digital audio object to generate a spectrogram of the digital audio object; processing the spectrogram using a watermark generation neural network to generate a watermark for the digital audio object; combining the watermark and the spectrogram to obtain a watermarked spectrogram; and converting the watermarked spectrogram to the watermarked digital object.

35. The method of any one of clauses 27-34, wherein the digital object includes an image.

36. The method of any one of clauses 27-35, wherein the digital object includes a digital audio object.

37. The method of any one of clauses 27-36, wherein the watermarking neural network comprises a neural network with a U-Net architecture, and/or wherein the watermark decoding neural network comprises a neural network with a convolutional neural network architecture.

38. The method of any one of clauses 27-37, wherein the watermark decoding neural network has more trainable parameters than the watermarking neural network.

39. The method of any one of clauses 27-38, wherein the watermarking signal zero, one, or more than one, watermark message bits.

40. One or more computer storage media storing instructions that when executed by one or more computers cause the one or more computers to perform the operations of the respective method of any one of clauses 1-39.

41. A system comprising: one or more computers; and one or more storage devices communicatively coupled to the one or more computers, wherein the one or more storage devices store instructions that, when executed by the one or more computers, cause the one or more computers to perform operations of the respective method of any one of clauses 1-39.

What is claimed is:

1. A computer-implemented method of training a watermarking system comprising a watermark generation neural network and a watermark decoding neural network, comprising:

for a plurality of images:

processing the image using the watermark generation neural network to generate a watermark for the image;

combining the watermark for the image and the image to obtain a watermarked image;

applying an adversarial transformation to the watermarked image, to generate a perturbed watermarked data object;

applying an adversarial transformation to the image to generate a perturbed data object;

processing the perturbed watermarked data object using the watermark decoding neural network to generate a first watermarking signal that indicates whether or not the perturbed watermarked data object is predicted to be watermarked;

processing the perturbed data object using the watermark decoding neural network to generate a second watermarking signal that indicates whether or not the perturbed data object is predicted to be watermarked; and jointly training the watermark decoding neural network and the watermark generation neural network, using the first watermarking signal and the second watermarking signal, to distinguish between the perturbed watermarked data object and the perturbed data object.

2. The method of claim 1, wherein jointly training the watermark decoding neural network and the watermark generation neural network comprises backpropagating gradients of a classification-based objective function that has a value that depends on classifying the first watermarking signal as indicating that the perturbed watermarked data object is watermarked and classifying the second watermarking signal as indicating that the perturbed data object as not watermarked.

3. The method of claim 1, comprising applying the adversarial transformation to the image to generate the perturbed data object, wherein applying the adversarial transformation comprises changing the values of pixels in the image data object.

4. A computer implemented method of verifying the provenance of a digital object, wherein the digital object comprises an image, the method comprising:

maintaining an object verification system comprising:

a first interface to receive a digital object or a request to generate a digital object;

a second interface to provide a watermarked digital object for use;

an embedding neural network configured to process the digital object to generate an embedding of the digital object; and an object verification database configured to store at least the embedding of the digital object; the method further comprising:

receiving a query digital object for verification, wherein the query digital object comprises an image;

processing the query digital object using a watermark decoding neural network to generate a watermarking signal for the query digital object;

processing the query digital object using the embedding neural network to generate a query embedding of the query digital object;

interrogating the object verification database using the query embedding to determine a set of one or more similarity scores for a corresponding set of one or more stored embeddings of digital objects that are similar to the query digital object; and verifying a provenance of the query digital object based on a combination of the watermarking signal and the set of one or more similarity scores.

5. The method of claim 4, wherein the object verification system is an object generation and verification system, wherein the request comprises a request to generate the digital object, wherein maintaining the object verification system further comprises maintaining a generative neural network configured to process the request to generate the digital object in accordance with the request; the method further comprising:

receiving a request to generate the digital object;

processing the request using the generative neural network to generate the digital object;

processing the digital object using the watermarking neural network to generate the watermarked digital object by:

processing the digital object using a watermark generation neural network to generate a watermark for the digital object, combining the watermark and the digital object to obtain a watermarked digital object;

providing the watermarked digital object for use;

processing the digital object using the embedding neural network to generate the embedding of the digital object;

storing the embedding of the digital object in the object verification database; and verifying the provenance of the query digital object as generated by the object generation and verification system conditional upon the query embedding matching the embedding of the digital object stored in the object verification database.

6. The method of claim 5, further comprising:

storing the digital object in the object verification database; and using the stored digital object to detect attempted removal of a watermark from the query digital object.

7. The method of claim 4, wherein the watermarking neural network and the watermark decoding neural network have been jointly trained to generate the watermarking signal under an adversarial perturbation of the watermarked digital object.

8. The method of claim 4, wherein the watermarking neural network comprises a neural network with a U-Net architecture and has more trainable parameters than the watermarking decoding neural network.

9. A computer-implemented method of watermarking an image, the method comprising:

receiving the image, the image having an original size;

generating a resized image by resizing the image to have a target size;

processing the resized image using a watermark generation neural network to generate a watermark for the resized image;

generating a watermarked version of the resized image using the watermark for the image generated by the watermark generation neural network and the resized image; and resizing the watermarked image to the original size.

* * * * *